(12) United States Patent
Brill et al.

(10) Patent No.: US 7,552,744 B2
(45) Date of Patent: Jun. 30, 2009

(54) DECOMPRESSION VALVE

(75) Inventors: Rainer Brill, Nidda (DE); Klaus Schlepp, Maxhütte-Birkenhöhe (DE); Michael Weber, Bernhardswald (DE); Georg Wittenzellner, Obertraubling (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 382 days.

(21) Appl. No.: 10/549,834

(22) PCT Filed: Feb. 3, 2004

(86) PCT No.: PCT/EP2004/000946

§ 371 (c)(1),
(2), (4) Date: Jun. 20, 2006

(87) PCT Pub. No.: WO2004/083700

PCT Pub. Date: Sep. 30, 2004

(65) Prior Publication Data
US 2006/0260694 A1 Nov. 23, 2006

(30) Foreign Application Priority Data
Mar. 19, 2003 (DE) ................... 103 12 177
Nov. 26, 2003 (DE) .................. 203 18 265 U

(51) Int. Cl.
*F16K 15/06* (2006.01)
*F16K 37/00* (2006.01)
*F16K 35/10* (2006.01)

(52) U.S. Cl. ............... 137/516.27; 137/382; 137/529; 137/554

(58) Field of Classification Search ............ 137/59, 137/516.27, 541, 535, 601.2, 601.19, 554, 137/377, 382, 536, 529, 557
See application file for complete search history.

(56) References Cited

U.S. PATENT DOCUMENTS

| 328,840 | A | * | 10/1885 | Witt | 181/237 |
| 429,632 | A | | 6/1890 | Martyn | 105/87 |
| 588,779 | A | * | 8/1897 | Reinach | 137/601.19 |
| 2,028,754 | A | * | 1/1936 | Crecca et al. | 137/173 |
| 2,028,755 | A | * | 1/1936 | Crecca et al. | 137/173 |
| 2,028,756 | A | * | 1/1936 | Crecca et al. | 137/512.3 |
| 2,113,027 | A | * | 4/1938 | Kindl et al. | 137/601.16 |
| 3,100,502 | A | * | 8/1963 | Ford et al. | 137/491 |

(Continued)

FOREIGN PATENT DOCUMENTS

BE 452471 10/1973

(Continued)

*Primary Examiner*—John Rivell
*Assistant Examiner*—Macade Brown
(74) *Attorney, Agent, or Firm*—Andrew Wilford

(57) ABSTRACT

A pressure-relief valve has a flange formed with a through-going port. A spring plate spaced outward from the port is mounted on a rigid post fixing the spring plate relative to the flange. A valve body between the plate and the flange can shift between a closed position engaging the seal and closing the port and an open position spaced outward from the port and permitting flow through the port; A spring braced between the spring plate and the valve body urges the valve body into the closed position. A cup-shaped housing covering the valve body, spring plate, post, and springs has an end wall spaced from the flange and a side wall projecting from the end wall toward the casing and formed with a vent opening.

15 Claims, 9 Drawing Sheets

U.S. PATENT DOCUMENTS

| | | | | |
|---|---|---|---|---|
| 3,217,082 A | * | 11/1965 | King et al. | 174/11 R |
| 3,310,064 A | * | 3/1967 | Voos | 137/234.5 |
| 3,447,565 A | * | 6/1969 | Davis, Jr. | 137/541 |
| 3,844,310 A | | 10/1974 | Brindisi | 137/557 |
| 3,914,528 A | | 10/1975 | Johnson | 174/11 R |
| 4,016,899 A | * | 4/1977 | Fletcher | 137/115.16 |
| 4,676,266 A | | 6/1987 | Johnson | |
| 4,843,187 A | | 6/1989 | Johnson | 174/11 R |
| 4,944,424 A | * | 7/1990 | Wood, Jr. | 220/724 |
| 5,058,758 A | | 10/1991 | Suddeth | 220/724 |
| 5,529,096 A | | 6/1996 | Rowe, Jr. et al. | 123/54.3 |
| 5,687,757 A | | 11/1997 | Heintz | 137/382 |
| 5,855,225 A | | 1/1999 | Williams, III | |
| 5,937,893 A | | 8/1999 | Herz | 137/382 |
| 6,422,127 B1 | * | 7/2002 | Huber et al. | 91/452 |
| 6,668,853 B2 | * | 12/2003 | Dean | 137/315.04 |
| 7,111,637 B2 | * | 9/2006 | Herz | 137/382 |
| 7,210,497 B2 | * | 5/2007 | Herz | 137/469 |

FOREIGN PATENT DOCUMENTS

| | | |
|---|---|---|
| DE | 1081290 | 10/1960 |
| WO | WO 98/54498 | 12/1998 |

* cited by examiner

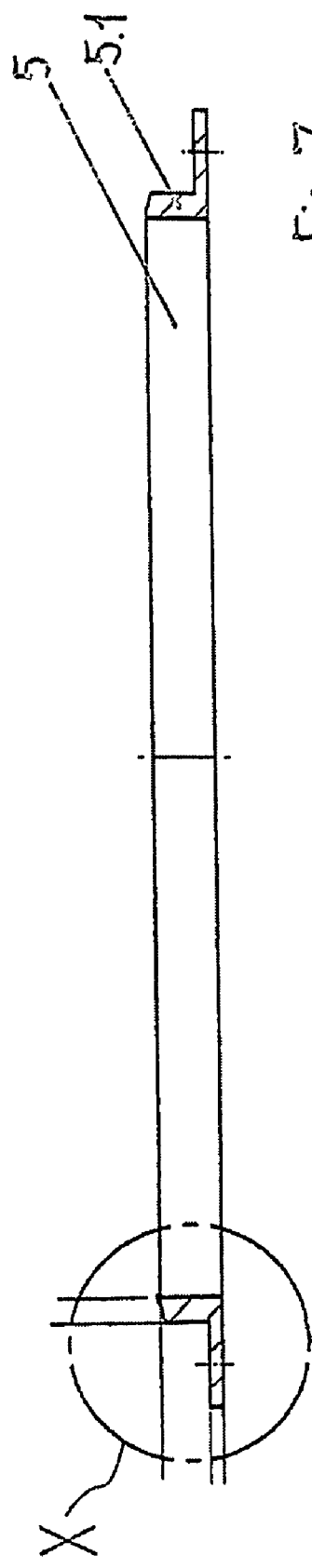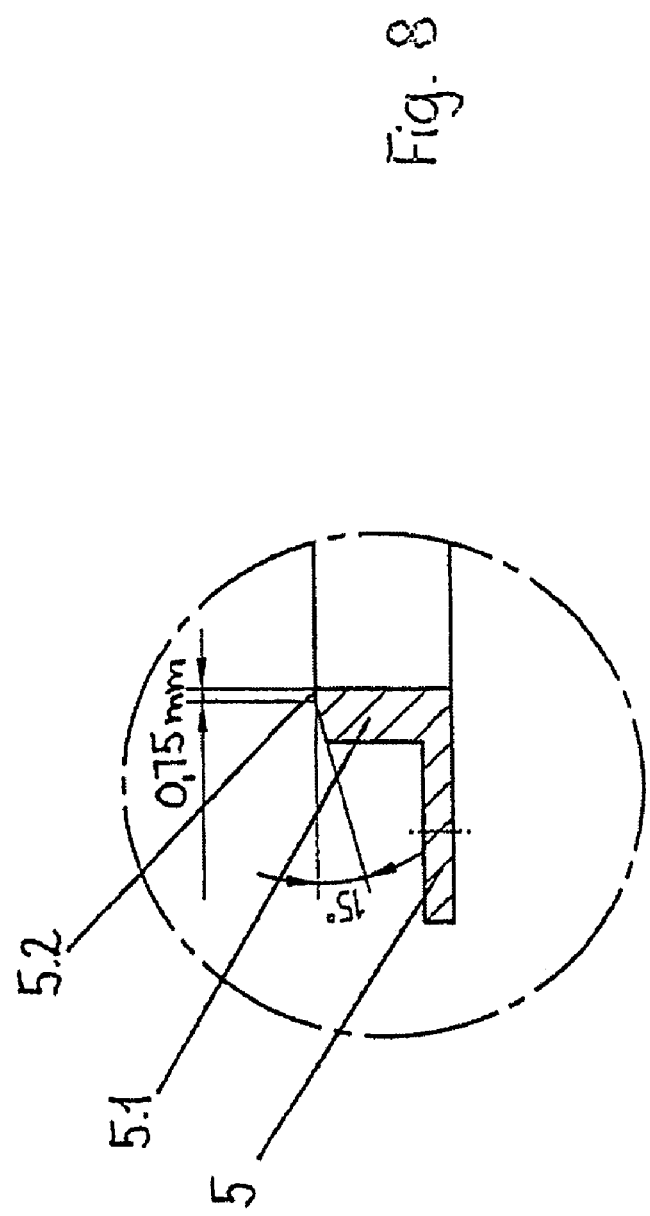

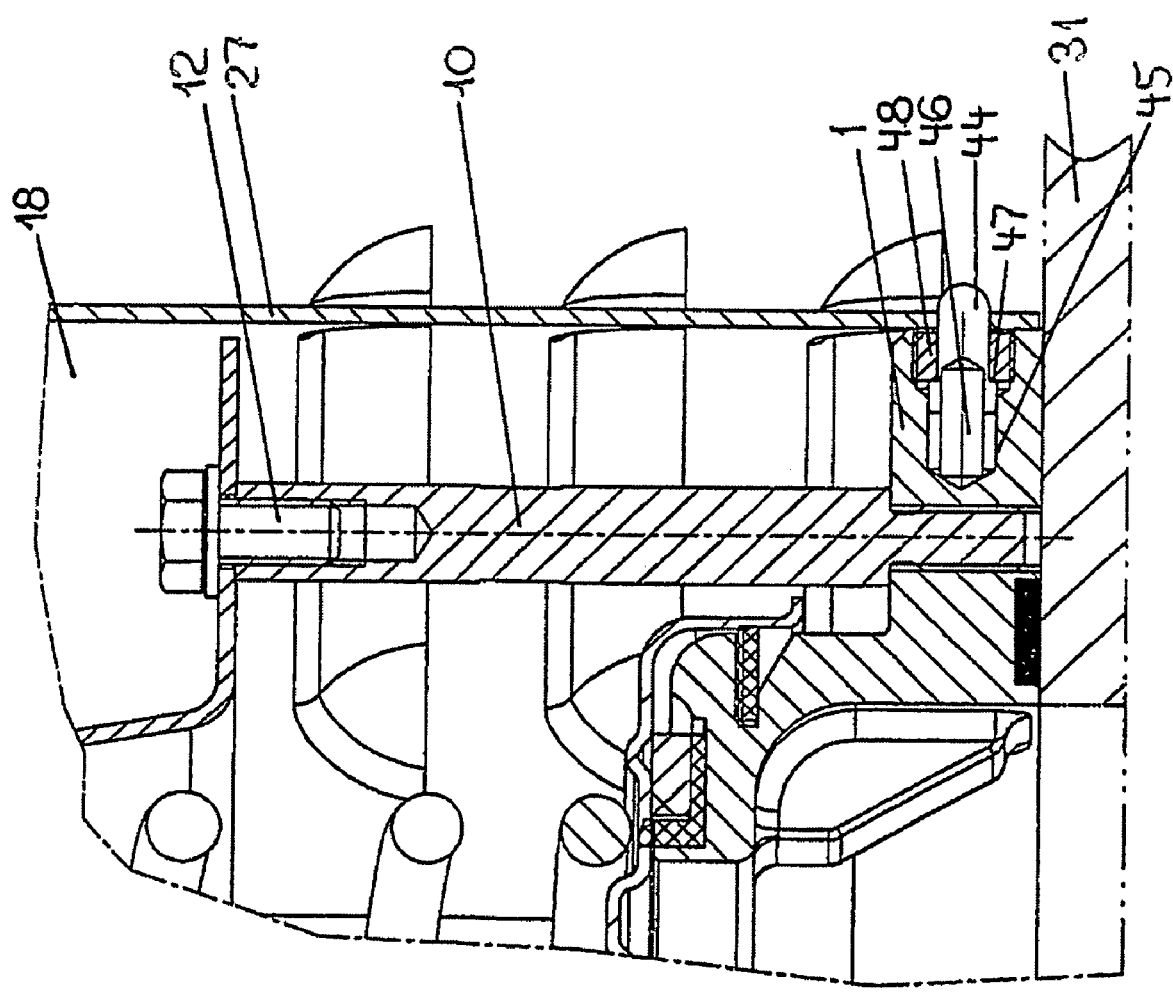

DECOMPRESSION VALVE

CROSS REFERENCE TO RELATED APPLICATIONS

This application is the US national phase of PCT application PCT/EP2004/000946, filed 3 Feb. 2004, published 30 Sep. 2004 as WO 2004/083700, and claiming the priority of German patent application 10312177.3 filed 19 Mar. 2003 and German patent application 20318265.0 filed 26 Nov. 2003 whose entire disclosures are herewith incorporated by reference.

FIELD OF THE INVENTION

The invention relates to a pressure-relief valve for oil-filled transformers and tap changers. When, as a result of some sort of failure or disturbance, pressure in a casing of a transformer or in a tap changer exceeds a predetermined limit, the normally closed pressure-relief valve opens and relieves pressure in the transformer or tap changer into the surrounding atmosphere.

BACKGROUND OF THE INVENTION

Such a pressure-relief valve that is mounted in a port on the top of a transformer casing is known from U.S. Pat. No. 3,914,528. It has a circular housing flange that is screwed to the port of the transformer casing. On the lower face of the housing flange turned toward the top of the transformer casing there is an annular seal creating an oil-tight seal. The port of the housing flange is normally closed by a spring-loaded valve body described further below. A round downwardly open cup-shaped housing cover is secured on the housing flange by bolts and screws. The upper nearly horizontal face of the housing cover has an inner concentric step. Between the housing cover and the above-described valve body there are one or more prestressed compression springs that are braced upwardly against the inner face of the housing cover and downwardly against the top face of the valve body so as to push same down against the housing flange such that its port is closed oil-tight. To this end the upper side of the housing flange turned toward the valve body has an annular seal ring. If the pressure inside the transformer casing exceeds the response pressure of the springs, the valve body lifts and allows pressure equalization; subsequently it is pushed by the springs again back down on the annular seal on the upper side of the housing flange. In addition it is possible with this known pressure-relief valve to provide on the upper face, outside the housing cover, optical indicators that can be seen from afar to indicate if the pressure-relief valve has opened. Finally there are outside the housing cover also electrical monitor contacts or switches that serve for remote monitoring or indication as well as to turn off the transformer.

A further highly similar pressure-relief valve is known from U.S. Pat. No. 4,843,187. It has a particular cross section and special mounting means for the above-described peripheral seal ring between the upper face of the housing flange and the lower face of the valve body.

Another pressure-relief valve is known from U.S. Pat. No. 4,676,266. Here the valve cover is formed as a cup whose downwardly open side walls fit with another seal that is set in the annular face of the housing flange. This additional seal has a flat cross-sectional shape; when closed it is bent to the side—like a windshield-wiper blade—and seals the valve body at its side walls additionally against the housing flange. In case of a problem, when the valve plate rises up because of an overpressure in the transformer casing, this pressure is effective against the entire face of the valve body; the force effective on the body thus is greater and the valve snaps open very fast, inside a few milliseconds.

All these pressure-relief valves have several disadvantages. The main one is that if there is a problem with excessive pressure in the transformer casing, when the valve body is open, the highly pressurized medium is not under control and can squirt out of the pressure-relief valve. This medium, which squirts out abruptly and without warning, is extremely hot so that it poses a substantial risk of burns for nearby personnel, not to mention fouling the surroundings. A further disadvantage with the known pressure relief valves is that the switch contacts are provided without protection outside the actual device, with no shielding and not protected from UV-rays, ozone, rain, and the like. In addition they and their cables are exposed to the hot oil released when the valve opens.

A shield for pressure-relief valves is known from WO 1998/054498 (U.S. Pat. No. 5,987,893) that is fitted over the valves and that has a relief port that ensures that any released oil is guided away when the valve opens. Even this solution has technical problems. To start with it is a pure retrofit. The shield is mounted on the pressure-relief valve by means of the existing bolts and screws that secure the housing cover on the housing flange with the highly prestressed springs between them. To install the known shield, these nuts must be loosened, thereby releasing the spring-loaded housing cover. This runs the risk that the springs will pop up the housing cover and injure the installer. In another variant the known shield is secured by an additional flange adapter with the transformer casing. This is an expensive variant that not only requires extra parts, but that also creates seal problems which are dealt with by the provision of further seals that further complicate the assembly.

OBJECT OF THE INVENTION

It is an object of the invention to provide a pressure-relief valve of the above-described type that does not have the described disadvantages, that is in particular of compact construction and that, when open, conducts away the hot oil such that it protects adjacent structure and the surroundings from being fouled.

SUMMARY OF THE INVENTION

With the pressure-relief valve according to the invention a standard cover is an integral part of the assembly. That is, instead of a separate cover, there is a laterally fully closed, cup-shaped, upwardly closed housing. This housing is not mounted like a separate cover according to the prior art in a complicated manner on the actual pressure-relief valve. It is in particular not necessary to loosen the spring plate that is according to the invention underneath the housing. In this manner there is no possibility of accident; at the same time the possibility of forgetting to properly tighten the spring-cover plate is avoided in that the spring plate is installed at the factory; its retaining screws do not need ever to be loosened later. With the system of this invention there is thus no adapter that is necessary as in the prior-art systems; thus there are no additional seal problems. In general, the pressure-relief valve according to the invention is a compact closed device with everything held in one housing that can be easily directly mounted on the transformer casing.

Vent openings are formed on a cup-shaped side wall of the housing that allow there to be a controlled venting in case of accident. These vent openings can be dimensioned variously; according to a particular flow cross section one can avoid unwanted flow restriction while at the same time the oil flow can be controlled and its flow can be broken up. The provision of a plurality of small rather than a single large vent opening ensures in the simplest manner possible that a finger or foreign body cannot get inside the assembly. It is also possible to provide horizontal vent slots with each having an overhead shield hood. By providing the vent holes in the generally vertical side wall one gets good rain or drip protection. The cup-shaped housing also protects any eventually used switch contacts. By the provision of cable feedthroughs on a feedthrough plate according to a further preferred embodiment of the invention the cables can be protected against high strains; these additional cable feedthroughs withstand most of the tension in the cables and thus relieve the connections to the electrical terminals almost completely. In addition the described cables are protected from the hot oil in that the pressure-relief valve according to the invention has a defined oil outflow region that is partitioned off from that of the cable feedthroughs. This prevents the hot oil from directly contacting and damaging the cables.

BRIEF DESCRIPTION OF THE DRAWING

The invention is described in the following by way of example with reference to the drawings. Therein:

FIG. 7 is a detail view of a seal of this pressure-relief valve;

FIG. 8 is an enlarged view of this seal;

FIG. 9 is a third pressure-relief valve according to the invention partly in lateral section.

SPECIFIC DESCRIPTION

Figure 1:
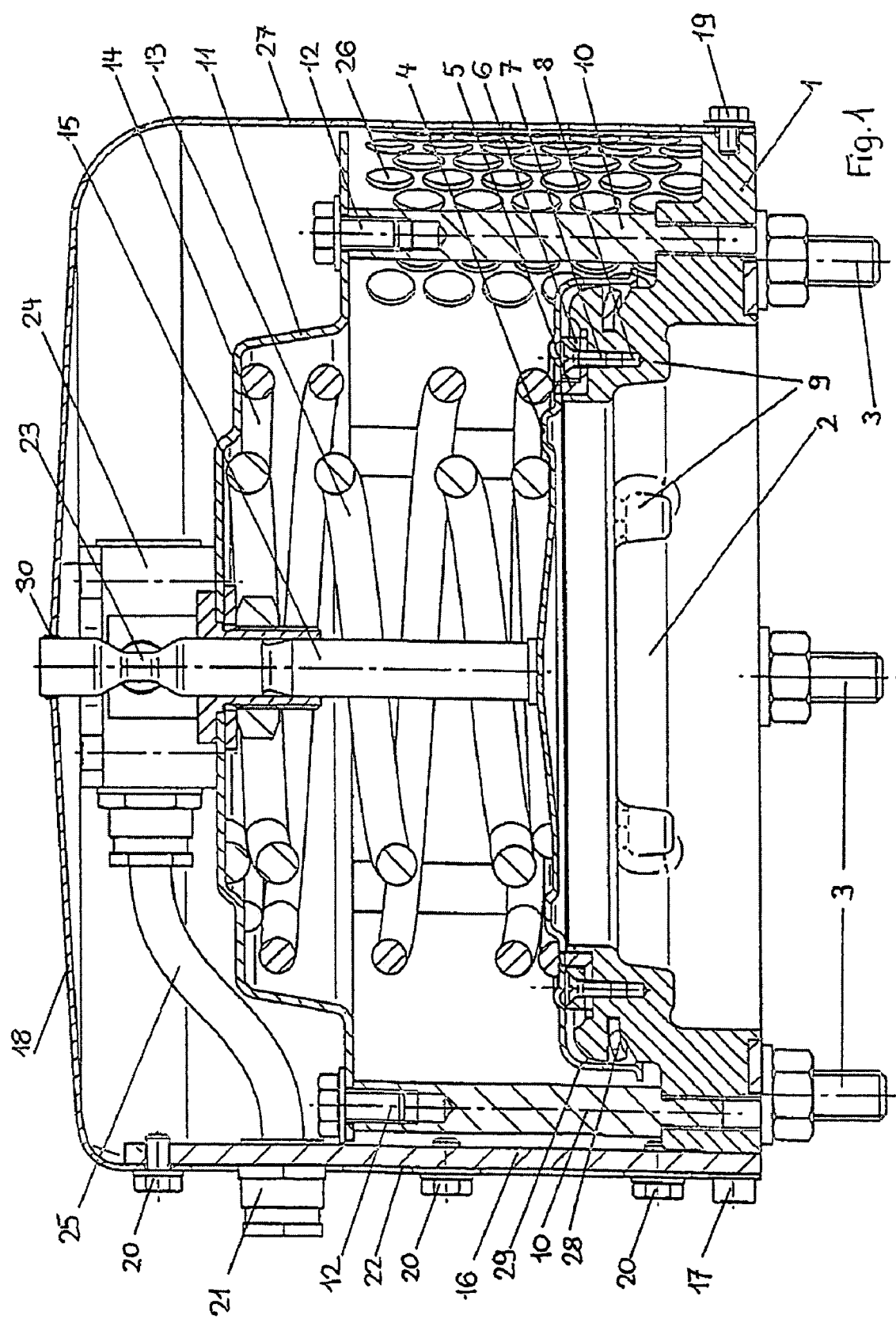
FIG. 1 is a first pressure-relief valve according to the invention in a closed (rest) position in a lateral schematic sectional view.

With reference at first to FIG. 1, the primary elements of a first pressure-relief valve according to the invention are described. It has a housing flange 1 that is made of cast iron and defines a throughgoing port 2. This housing flange 1 is secured to an unillustrated transformer casing in the standard manner by a circular array of mounting screws 3. A valve body 4 upwardly closes the port 2 of the flange 1 in the known manner. To ensure oil tightness, there is an L-section seal ring 5 that is secured in place on the housing flange 1 by a retaining ring 6 and an annular array of screws 7. To this end there are threaded bores 8 on reinforcement ribs 9 of the housing flange 1, in which the screws 7 are threaded so that the retaining ring solidly holds the seal ring 5. In addition bolts 10 with internal screwthreads are screwed into the housing flange 1 and extend vertically upward therefrom. A spring plate 11 acting like the housing cover in the prior art is secured by screws 12 that are threaded down into the internal screwthreads of the bolts 10. Between the spring plate 11 and the valve body 4 there are the standard two prestressed springs, namely an inner spring 13 and an outer spring 14. Both the inner spring 13 and the outer spring 14 are upwardly braced at concentric locations on the lower face of the spring plate 11; their upper (translator's note, should be "lower") ends bear on the valve body 4 which has a complementary concentrically stepped shape. In the center of the valve body 4 there is an indicator pin 15 that projects vertically upward. The housing flange 1 carries on one side an upright feedthrough plate 16 with mounting screws 17 that is described more closely below. The entire assembly is contained in a cup-shaped housing 18 that is secured by screws 19 on the housing flange 1 and by further screws 20 on the feed-through plate 16. The feedthrough plate 16 has several cable feedthroughs 21; to allow the housing 18 to be mounted, it has a lateral opening 22 that slips downward during assembly over the cable feedthroughs 21. The indicating pin 15 has in its upper end region inside the assembly a switching cam 23 that coacts with one or more switches 24, a roller or limit switch. Cables 25 from these switches 24 extend outward through the cable feedthroughs 21. On the side of the housing 18 opposite the cable feedthroughs 21 there are outlet openings 26 that are formed in a vertical and downwardly extending side wall 27. In the illustrated embodiment they are a number of small bores that each have a diameter at most equal to 12 mm although it is possible as stated above for them to have numerous other shapes or sizes within the scope of the invention. Finally there is another seal 28 formed as a seal lip as in U.S. Pat. No. 4,676,266 to act like a windshield wiper and that fits in a downwardly bent cup-shaped wall 29 of the valve body 4. This additional seal 28 is not essential to the pressure-relief valve but serves merely to prevent a fluttering of the valve and to increase its opening speed. Finally the indicating pin 15 projects through an opening 30 in the top of the housing 18, that is to the outside.

Figure 2:
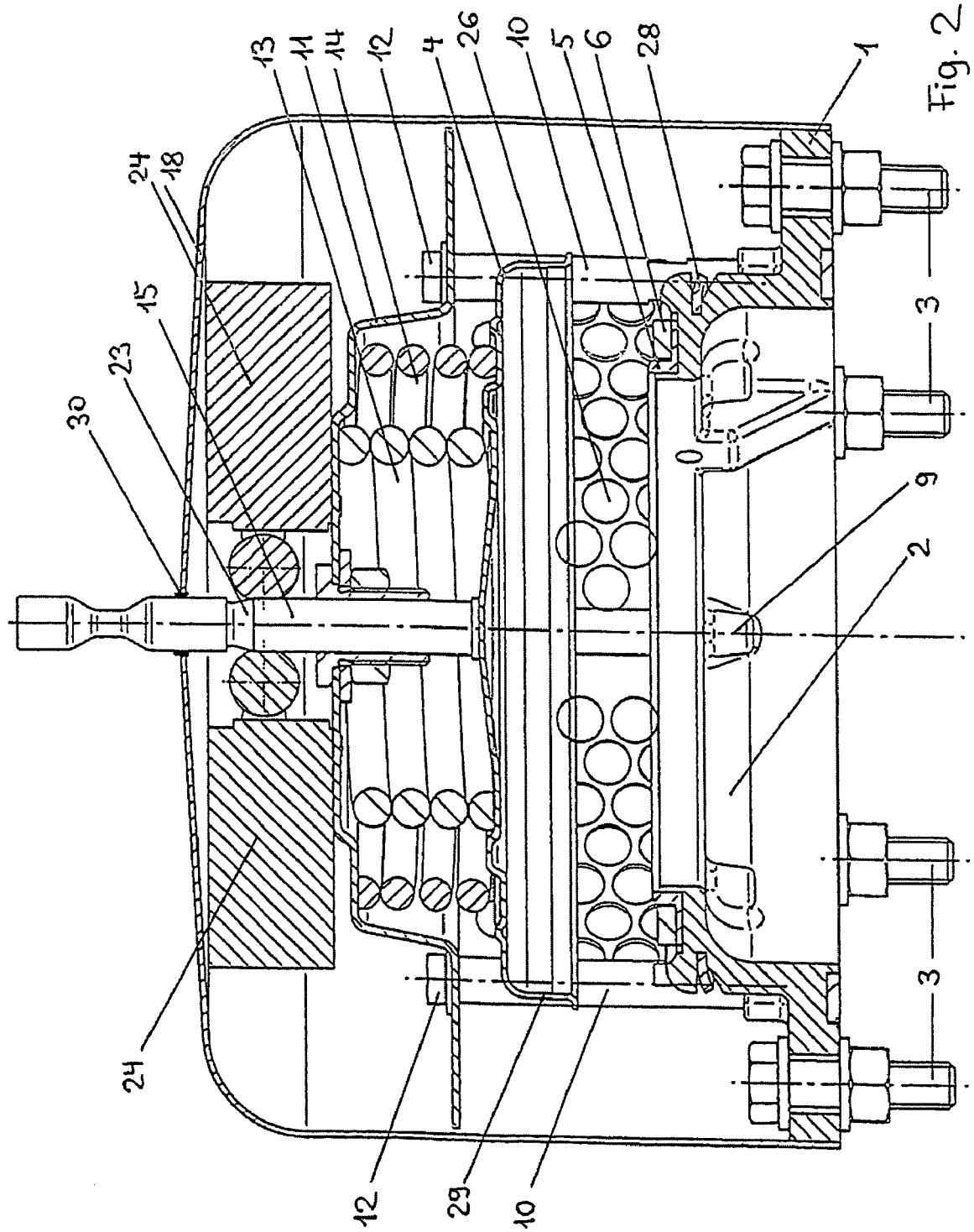
FIG. 2 is this pressure-relief valve in the open position relieving pressure in the same section but 90° offset horizontally.

FIG. 2 shows the same assembly rotated through 90° about a vertical axis but in the open position. It can be seen that when there is an overpressure in the unillustrated transformer casing the valve body 4 is pushed upward against the force of the springs 13 and 14. In this position the valve body 4 no longer engages the seal 5; the seal 28 however is also disengaged from the side wall 29 of the valve body 4. Excess hot liquid and gas thus enter into the pressure-relief valve and flow out through the holes 26. The indicating pin 15 rises with the valve body 4. Its cam formation 23 operates the electrical switch 24. It is also possible that the now outwardly projecting end of the indicating pin 15 can be used to actuate another here not illustrated indicator. The spring plate 11 ensures that the space that the oil can fill is upwardly closed. The hot mass of oil cannot get to the switch 24 or its cables 25 to damage them. Once the overpressure is relieved, the springs 13 and 14 will return the valve body 4 to its rest position; the seals 5 and 28 seal the valve body with respect to the port 2.

Figure 3:
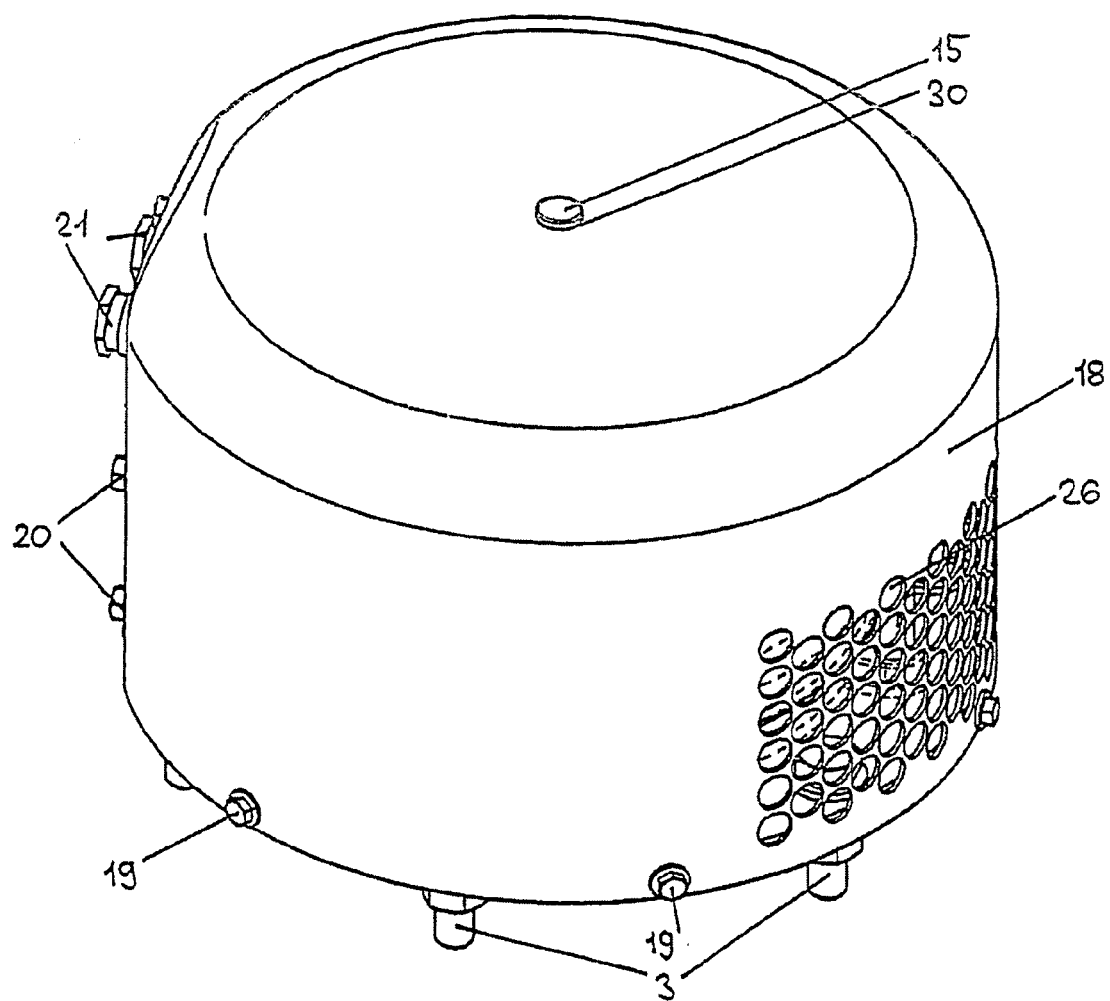
FIG. 3 is this pressure-relief valve seen from outside in perspective view.

FIG. 3 shows the entire assembly in perspective view. It is clear that the housing 18 completely contains all parts. It can further be seen that to secure it on a transformer casing no further adapter is needed, not even when during the service life of the assembly the spring-loaded spring plate must be removed. Finally it is clear that this device has no electrical switches or connections that could be damaged outside the housing.

Figure 4:
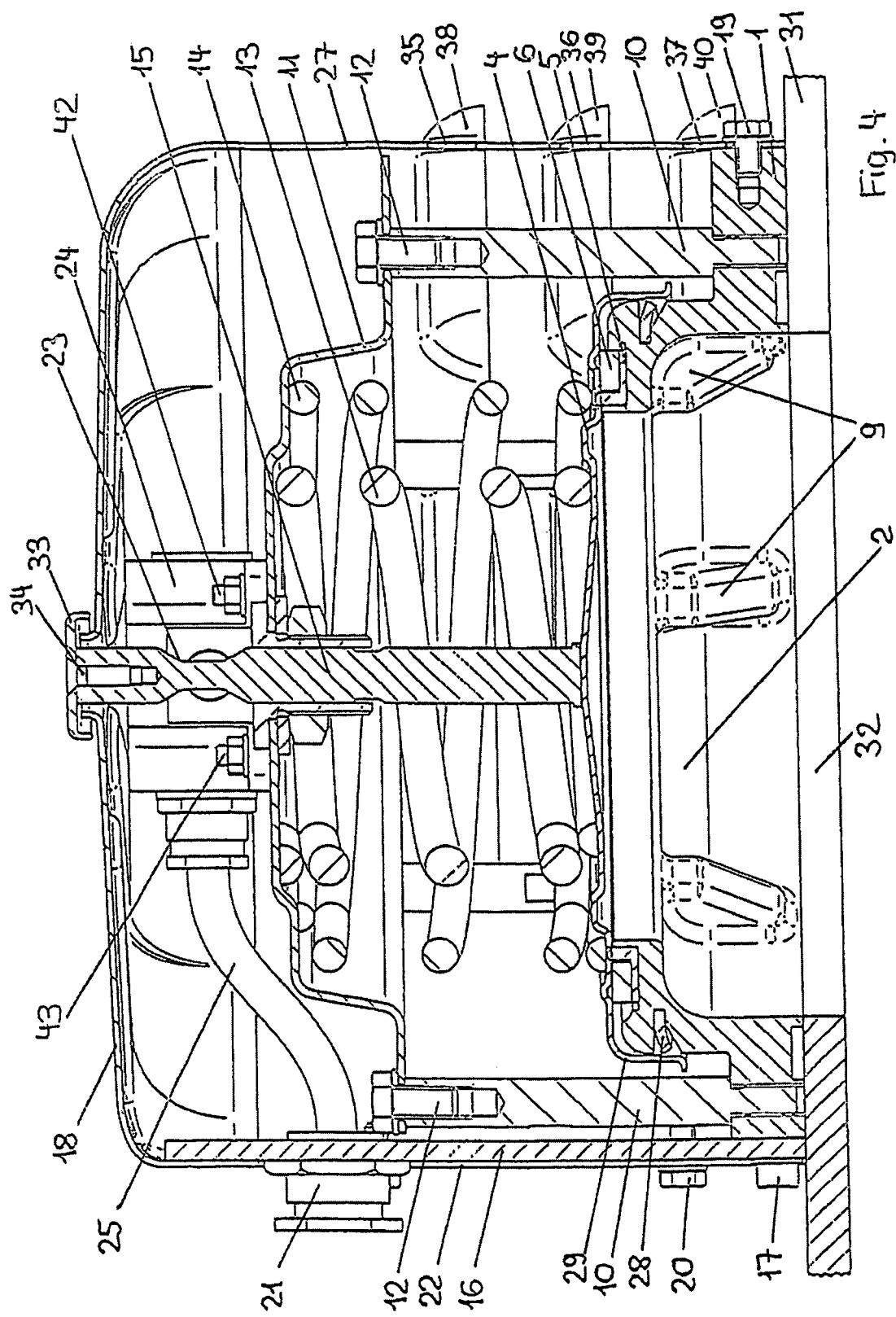
FIG. 4 is a second pressure-relief valve according to the invention in closed (rest) position in a lateral schematic sectional view.
Figure 5:
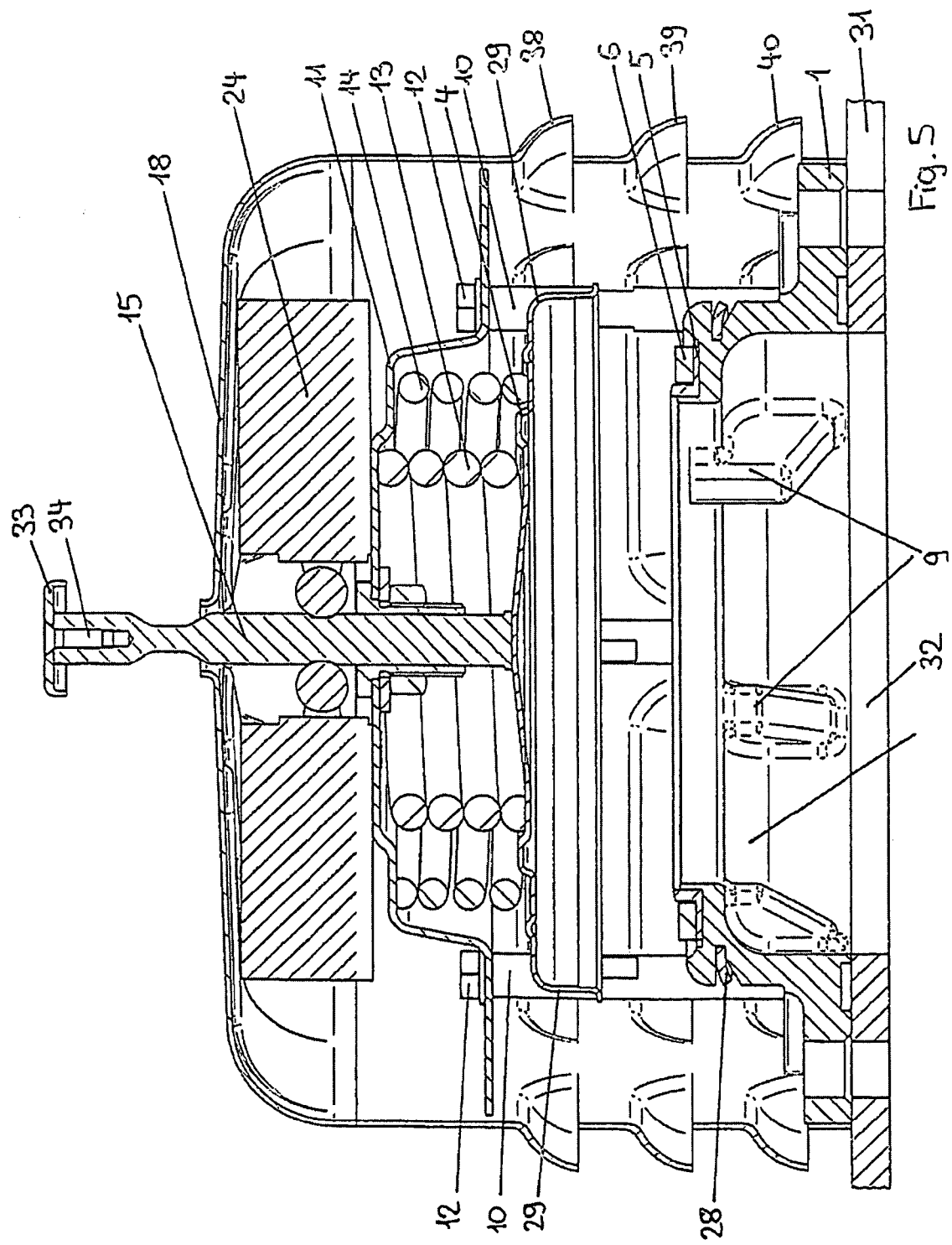
FIG. 5 is this pressure-relief valve in the open position relieving pressure in the same section but 90° offset horizontally.
Figure 6:
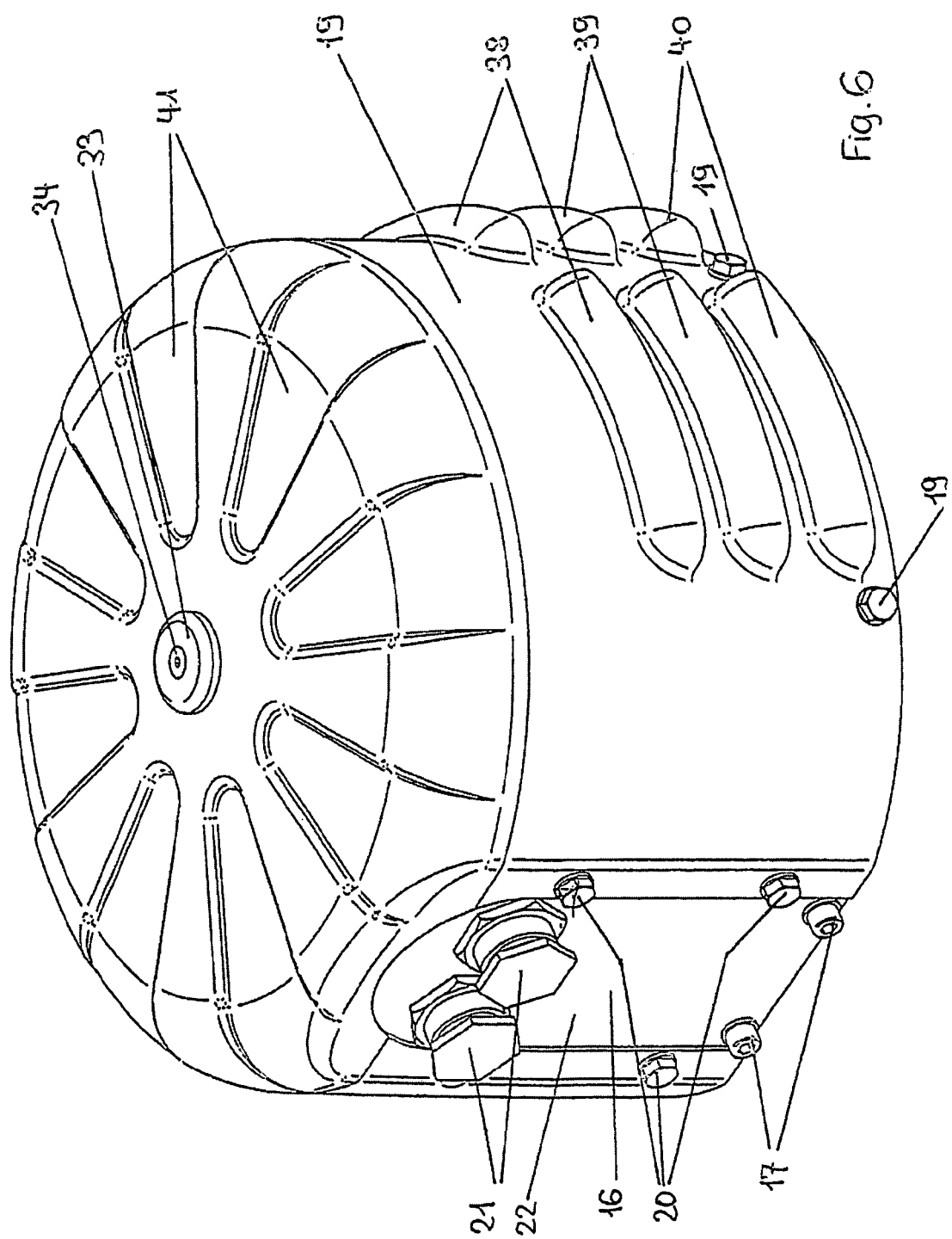
FIG. 6 is this pressure-relief valve seen from outside in perspective view.

FIGS. 4 to 6 show the principal elements of a second different embodiment of the pressure-relief valve according to the invention. Identical parts are assigned the same references; the basic structure corresponds to that of the first embodiment. Unlike the above-described first embodiment described with reference to FIGS. 1 to 3, here a transformer cover 31 is shown that has a port 32 to which the pressure-relief valve with the housing flange 1 and the central port 2 are secured. In this embodiment the indicator pin 15 carries on its upper end that projects out of the housing 18 a mushroom-shaped head 33. This mushroom head 33 protects the entire pressure-relief valve and also the switch 24 from the entry of rain water. It can also have an additional seal not shown here. The mushroom head 33 is preferably secured from above by a mounting screw 34 on the indicator pin 1. In this embodiment there are, instead of circular outlet holes, vent slots 35, 36, and 37 that extend angularly in offset horizontal planes in the cup-shaped side wall 27 of the housing 18. From outside there are vent hoods 38, 39, 40 that prevent rain from entering into the vent slots 35, 36, and 37 by shielding them from above. This embodiment also ensures that neither fingers or other foreign bodies can get inside. The vent hoods 38, 39, and 40 can also be formed as separate elements applied externally to the housing 18. Finally in this embodiment there are also stiffening ribs 41 in the upper horizontal part of the housing so as to make this housing 18 very stiff.

The switch 24 can be mounted preferably by threaded stud assemblies 42, 43 projecting upward from the spring plate 11. This makes it simple to install one or several switches 24 from above without having to remove other parts outside the housing 18. Preferably enough stud subassemblies 42, 43 are provided in particular locations that the maximum number of switches 24 can be installed. If only or a few or no switches are needed, the unused studs remain free. It would also be possible as known in the prior art to mount the switch from above by screws threaded directly into the spring plate 11. The disadvantage of this is that the spring plate 11 is relatively thin so that the screwthreads could tear out; this disadvantage is avoided according to the proposed mounting by means of inset threaded stud assemblies 42, 43.

FIGS. 7 and 8 show the already described L-section seal 5. A leg 5.1 of this seal 5 projects upward against the valve body 4 and seals the port 2. In a particularly advantageous embodiment, a seal face 5.2, that in the rest position bears on the valve body 4, is beveled, e.g. by 15°. In this manner the effective seal surface is reduced and the specific biasing pressure is increased, which is particularly important for low reaction pressures, e.g. 8 PSI. in addition this beveling facilitates the fit of the seal face 5.2 on any unavoidable irregularities of the valve body 4.

FIG. 9 shows a detail of a further pressure-relief valve according to the invention with a particularly advantageous system for securing the housing 18 directly to the housing flange 1.

Whereas in the above-described embodiments, mounting is effected by horizontal bolting here pusher pins 44 fitting in bores 45 of the housing flange 1 are provided, with their outer ends spring biased outward through corresponding holes in the cup-shaped side wall 27 of the housing 18. This spring loading of the pins 44 is the job of respective springs 46 braced between inner ends of the pins 44 and floors of the bores 45. Each pin 44 is provided with a radially outwardly projecting stop shoulder 47 on its cylindrical outer surface that is engaged against a stop sleeve 48 screwed into the housing flange 1. The outer end of each pin 44 is spherically rounded to facilitate sliding of the side wall 27 of the housing 18 into place. The rounded ends of the pins 44 engage outward in assembled condition through the corresponding openings; for disassembly they are pushed inward against the force of their springs 46 and the housing 18 is lifted off. This embodiment makes it possible to install and remove the housing 18 without the use of tools, while still securing this housing 18 directly to the flange 1.

Figure 10:
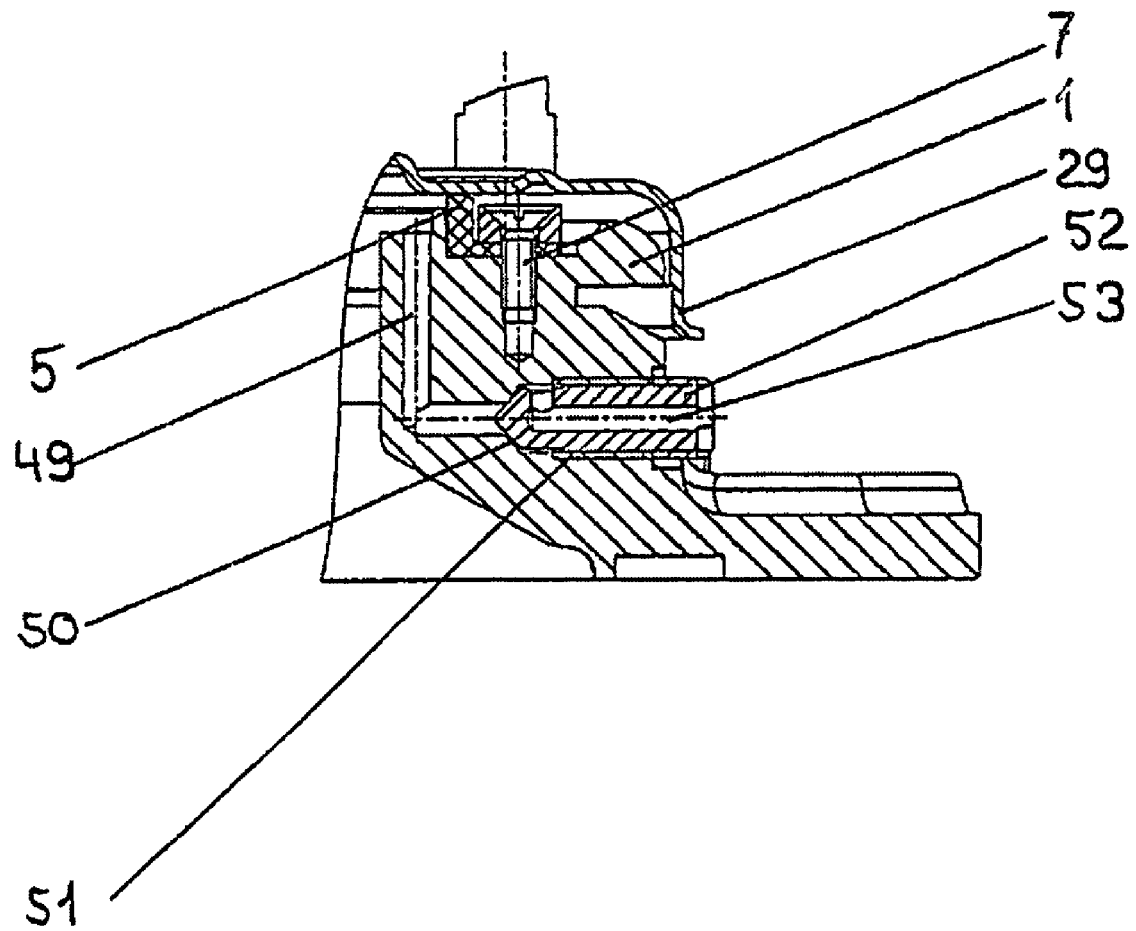
FIG. 10 is a fourth pressure-relief valve according to the invention, again in a detail lateral section.

FIG. 10 finally shows a further detail of a particularly advantageous further developed pressure-relief valve according to the invention with venting. When mounted horizontally it is possible that gas builds up inside the pressure-relief valve, so that there needs to be some special venting. To this end there is a vent passage 49 that extends through the housing flange 1 to a conical seat 5 at the end of a horizontal, outwardly extending threaded bore 51. A vent screw 52 is threaded from outside into this threaded bore 51 and bears at its inner end against the seat 50. The seat 50 of the threaded bore is dimensioned relative to the end of the vent screw 52 such that when it is screwed tight, the vent screw 52 completely closes the vent passage 49 without the use of any seal ring as in the prior art. It is particularly advantageous when the vent screw 52 is formed with a central vent bore 53 that is closed in the closed position of the vent screw 52. In this manner the pressure-relief valve can be vented by partially screwing out and loosening the vent screw 52, after which it is again screwed tight.

The invention claimed is:

1. A pressure-relief valve for an oil-filled transformer or tap changer having a casing, the valve comprising:
   a flange formed with a throughgoing port;
   means for securing the flange to the casing;
   a seal surrounding the port;
   a spring plate spaced outward from the port;
   a rigid post secured directly to the spring plate and to the flange and fixing the spring plate relative to the flange;
   a valve body between the spring plate and the flange and displaceable between a closed position engaging the seal and closing the port and an open position spaced outward from the port and permitting flow out of the casing through the port;
   a spring having an outer end bearing against the spring plate and an inner end bearing against the valve body to urge the valve body into the closed position, whereby when pressure in the casing exceeds a predetermined limit the valve body is pushed out and fluid in the casing can pass into the housing and thence out of the housing;
   a cup-shaped housing engaged over and covering the valve body, spring plate, post, and spring, the housing having an end wall spaced from the flange and a side wall projecting from the end wall toward the casing and forming a rim, the spring plate subdividing an interior of the housing into an inner compartment holding the valve body and spring and into which the port opens and a separate outer compartment between the spring plate and the end wall, the side wall being formed at the inner compartment with a throughgoing vent opening, whereby the spring plate blocks fluid flow from the inner compartment to the outer compartment;
   means for removably securing the rim directly to the flange, whereby removal of the housing exposes the spring plate, post, valve body, and spring;
   a rigid feedthrough plate fixed to the flange and extending to the outer compartment, the housing side wall being fitted around the feedthrough plate; and
   a cable extending from a switch inside the outer compartment through the feedthrough plate to outside the compartment.

2. The pressure-relief valve defined in claim 1, further comprising:
   an indicating member fixed on the valve body and projecting through the spring plate into the outer compartment; and the switch in the outer compartment actuatable by the indicating member.

3. The pressure-relief valve defined in claim 2 wherein the outer compartment is above the inner compartment.

4. The pressure-relief valve defined in claim 1, further comprising
screws securing the housing to the feedthrough plate.

5. The pressure-relief valve defined in claim 1 wherein the vent opening is formed in the housing side wall opposite the feedthrough plate.

6. The pressure-relief valve defined in claim 2, further comprising
at least one stud on the spring plate, the switch being mounted on the stud.

7. The pressure-relief valve defined in claim 2, wherein the indicating member is a pin projecting through the end wall of the housing.

8. The pressure-relief valve defined in claim 7 wherein the pin has an outer end provided with a mushroom-shaped head.

9. The pressure-relief valve defined in claim 1, further comprising
at least one pin displaceable transversely of the side wall in the flange between an outer position projecting from the flange through a complementary hole in the housing side wall and an inner position recessed in the flange; and
a respective spring braced between the pin and the flange and urging the pin into the outer position.

10. The pressure-relief valve defined in claim 9 wherein the pin has a rounded end.

11. The pressure-relief valve defined in claim 1 wherein the flange is formed with a threaded bore having an inner end forming a seat and with a passage extending between the seat and an inner surface of the flange in the port, the valve further comprising
a threaded valve member screwed into the threaded bore and being screwable between an inner position engaging the seat and blocking the passage and an outer position disengaged from the seat and unblocking the passage.

12. The pressure-relief valve defined in claim 11 wherein the threaded valve member has a tip engageable with the seat and a bore having an outer end open outside the valve and an inner end open adjacent the tip, whereby, when the threaded valve member is screwed back off the seat, fluid can flow from the passage into the bore.

13. The pressure-relief valve defined in claim 1 wherein the vent opening is an array of small-diameter holes.

14. A pressure-relief valve for an oil-filled transformer or tap changer having a casing, the valve comprising:
a flange formed with a throughgoing port;
means for securing the flange to the casing;
a seal surrounding the port;
a spring plate spaced outward from the port;
a rigid post secured directly to the spring plate and to the flange and fixing the spring plate relative to the flange;
a valve body between the spring plate and the flange and displaceable between a closed position engaging the seal and closing the port and an open position spaced outward from the port and permitting flow out of the casing through the port;
a spring having an outer end bearing against the spring plate and an inner end bearing against the valve body to urge the valve body into the closed position, whereby when pressure in the casing exceeds a predetermined limit the valve body is pushed out and fluid in the casing can pass into the housing and thence out of the housing;
a cup-shaped housing engaged over and covering the valve body, spring plate, post, and spring, the housing having an end wall spaced from the flange and a side wall projecting from the end wall toward the casing and forming a rim, the housing being formed with a throughgoing and horizontally extending vent slot;
a rigid feedthrough plate fixed to the flange between the end wall and the spring plate, the housing side wall being fitted around the feedthrough plate;
means for removably securing the rim directly to the flange, whereby removal of the housing exposes the spring plate, post, valve body, and spring; and
a shield hood above the slot.

15. The pressure-relief valve defined in claim 1 wherein the seal has a beveled annular seal face engageable with the valve body.

* * * * *